(12) United States Patent
Marsala et al.

(10) Patent No.: US 10,132,952 B2
(45) Date of Patent: Nov. 20, 2018

(54) SENSOR FOR MEASURING THE ELECTROMAGNETIC FIELDS ON LAND AND UNDERWATER

(71) Applicants: Saudi Arabian Oil Company, Dhahran (SA); Groundmetrics, Inc., San Diego, CA (US)

(72) Inventors: Alberto F. Marsala, Dhahran (SA); Andrew Dennis Hibbs, LaJolla, CA (US)

(73) Assignees: Saudi Arabian Oil Company, Dhahran (SA); Groundmetrics, Inc. CA (US)

( * ) Notice: Subject to any disclaimer, the term of this patent is extended or adjusted under 35 U.S.C. 154(b) by 0 days.

(21) Appl. No.: 13/914,128

(22) Filed: Jun. 10, 2013

(65) Prior Publication Data

US 2014/0361777 A1    Dec. 11, 2014

(51) Int. Cl.
*G01V 3/08*    (2006.01)

(52) U.S. Cl.
CPC ............... *G01V 3/088* (2013.01); *G01V 3/08* (2013.01); *G01V 3/081* (2013.01)

(58) Field of Classification Search
CPC . G01V 3/12; G01V 3/083; G01V 3/15; G01V 3/08; G01V 3/081; G01V 3/02; G01V 3/087; G01V 3/17; G01V 3/175; G01V 3/18; G01V 3/26; G01V 3/265; G01V 3/082–3/088; G01V 3/28; G01V 3/30; G01V 3/40; G01V 3/38
USPC ................... 324/323–375; 175/50; 702/6–13
See application file for complete search history.

(56) References Cited

U.S. PATENT DOCUMENTS

| | | | | |
|---|---|---|---|---|
| 3,662,260 A | * | 5/1972 | Thomas | G01R 29/0878 324/344 |
| 4,904,942 A | | 2/1990 | Thompson | |
| 5,770,945 A | * | 6/1998 | Constable | G01V 3/082 324/345 |
| 6,037,776 A | * | 3/2000 | McGlone | G01V 3/081 324/345 |

(Continued)

FOREIGN PATENT DOCUMENTS

WO    2008073375 A2    6/2008
WO    2012100217 A1    7/2012

OTHER PUBLICATIONS

Marsala et al., "First Borehole to Surface Electromagnetic Survey in KSA: Reservoir Mapping and Monitoring at a New Scale", Saudi Aramco Journal of Technology, Winter 2011, pp. 36-45.

(Continued)

*Primary Examiner* — Jeff Natalini
*Assistant Examiner* — Steven Yeninas
(74) *Attorney, Agent, or Firm* — Bracewell LLP; Constance G. Rhebergen; Albert B. Kimball, Jr.

(57) ABSTRACT

An electromagnetic sensing system operates either in land environments or in marine environments on the floor of a body of water to measure electromagnetic fields. The sensing system has electrodes that provide capacitive coupling to the local environment where measurements are being made. A new method of deployment in water provides considerable size and weight reductions. The size and weight reductions also facilitate deployment and rapid repositioning on land. The system is particularly beneficial for surveying sites adjacent to bodies of water.

15 Claims, 5 Drawing Sheets

(56) References Cited

U.S. PATENT DOCUMENTS

| | | | | |
|---|---|---|---|---|
| 6,405,143 | B1* | 6/2002 | Pham | G06F 17/5018 |
| | | | | 324/300 |
| 6,739,165 | B1* | 5/2004 | Strack | G01V 3/083 |
| | | | | 702/13 |
| 7,141,968 | B2 | 11/2006 | Hibbs et al. | |
| 7,705,599 | B2* | 4/2010 | Strack et al. | 324/348 |
| 7,928,732 | B2 | 4/2011 | Nichols | |
| 8,076,941 | B2* | 12/2011 | Tulupov et al. | 324/365 |
| 8,289,025 | B2 | 10/2012 | Nichols et al. | |
| 8,347,658 | B2* | 1/2013 | Thompson | G01V 11/007 |
| | | | | 324/323 |
| 8,633,700 | B1* | 1/2014 | England et al. | 324/348 |
| 8,816,689 | B2* | 8/2014 | Colombo | G01V 3/26 |
| | | | | 324/328 |
| 8,896,313 | B2* | 11/2014 | Lindqvist | G01V 3/12 |
| | | | | 324/334 |
| 2002/0166699 | A1 | 11/2002 | Evans | |
| 2003/0025639 | A1* | 2/2003 | Rodney | G01V 11/002 |
| | | | | 343/719 |
| 2004/0000912 | A1* | 1/2004 | Conti et al. | 324/350 |
| 2004/0108854 | A1* | 6/2004 | Nichols | G01V 3/12 |
| | | | | 324/348 |
| 2005/0073302 | A1* | 4/2005 | Hibbs | A61B 5/04 |
| | | | | 324/247 |
| 2008/0094067 | A1* | 4/2008 | Constable | G01D 9/005 |
| | | | | 324/365 |
| 2008/0238429 | A1* | 10/2008 | Safinya | G01V 3/083 |
| | | | | 324/348 |
| 2008/0246485 | A1 | 10/2008 | Hibbs et al. | |
| 2008/0309346 | A1* | 12/2008 | MacGregor | G01V 3/083 |
| | | | | 324/334 |
| 2009/0171587 | A1* | 7/2009 | Lu | G01V 3/083 |
| | | | | 702/7 |
| 2009/0179649 | A1* | 7/2009 | Schmidt | G01V 3/26 |
| | | | | 324/345 |
| 2009/0184715 | A1* | 7/2009 | Summerfield | G01V 3/083 |
| | | | | 324/334 |
| 2009/0315539 | A1* | 12/2009 | Helwig | G01V 3/083 |
| | | | | 324/149 |
| 2009/0322357 | A1* | 12/2009 | Beaulieu | A01G 7/00 |
| | | | | 324/692 |
| 2010/0026304 | A1* | 2/2010 | Duncan | G01V 3/165 |
| | | | | 324/345 |
| 2010/0231223 | A1* | 9/2010 | Ellingsrud | G01V 3/083 |
| | | | | 324/365 |
| 2010/0321024 | A1* | 12/2010 | Nichols | G01V 3/083 |
| | | | | 324/348 |
| 2011/0001482 | A1* | 1/2011 | Alumbaugh | G01V 3/088 |
| | | | | 324/344 |
| 2011/0320125 | A1* | 12/2011 | Rykhlinkskaya | G01V 3/12 |
| | | | | 702/5 |
| 2012/0059585 | A1* | 3/2012 | Kjerstad | G01V 3/12 |
| | | | | 702/6 |
| 2012/0130641 | A1* | 5/2012 | Morrison | G01V 3/26 |
| | | | | 702/7 |
| 2012/0262179 | A1* | 10/2012 | Whan | G01V 11/00 |
| | | | | 324/345 |
| 2013/0146756 | A1* | 6/2013 | Schmidt | G01V 5/08 |
| | | | | 250/264 |
| 2013/0151155 | A1* | 6/2013 | Lindqvist | G01V 3/083 |
| | | | | 702/7 |
| 2014/0239957 | A1* | 8/2014 | Zhang | G01V 3/30 |
| | | | | 324/334 |
| 2014/0347055 | A1* | 11/2014 | Schmidt | G01V 3/12 |
| | | | | 324/338 |
| 2015/0047836 | A1* | 2/2015 | Mitchell | E21B 47/02216 |
| | | | | 166/254.1 |
| 2015/0160364 | A1* | 6/2015 | Hibbs | E21B 47/102 |
| | | | | 324/355 |

OTHER PUBLICATIONS

Vozkoff et al., "The Magnetotelluric Method" Investigations in Geophysics No. 3: Electromagnetic Methods in Applied Geophysics, vol. 2 Application, Parts A and B, 1991, pp. 641-711, Society of Exploration Geophysics, USA.

Zonge et al., "Controlled Source Audio-Frequency Magnetotellurics" Investigations in Geophysics No. 3: Electromagnetic Methods in Applied Geophysics, vol. 2 Application, Parts A and B, 1991, pp. 713-809, Society of Exploration Geophysics, USA.

Labrecque et al., "Assessment of measurement errors for galvanic-resistivity electrodes of different composition" Geophysics, 2008, pp. F55-F64, vol. 73, No. 2, Society of Exploration Geophysics.

International Search Report and Written Opinion for related PCT application PCT/US2014/041200 dated Jan. 7, 2015.

Shima et al., "Fast imaging of shallow resistivity structures using a multichannel capacitive electrode system", 65th Annual International Meeting of Society of Exploration Geophysicists, 1995, pp. 377-380, XP-002733673.

du Preez et al. "Water Resources of Arid Areas" Proceedings of the International Conference on Water Resources of Arid and Semi-Arid Regions of Africa, Gaborone, Botswana, Aug. 3-6, 2004, pp. 297-302.

European Examination Report dated Jan. 25, 2018 for corresponding European Application No. 14735051.6; pp. 1-6.

* cited by examiner

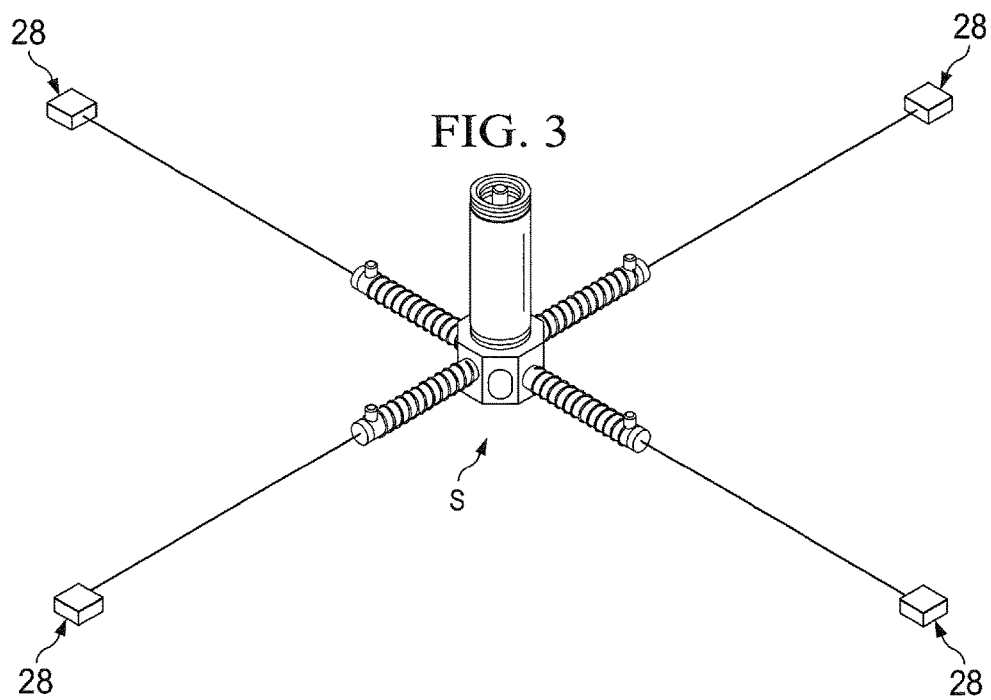
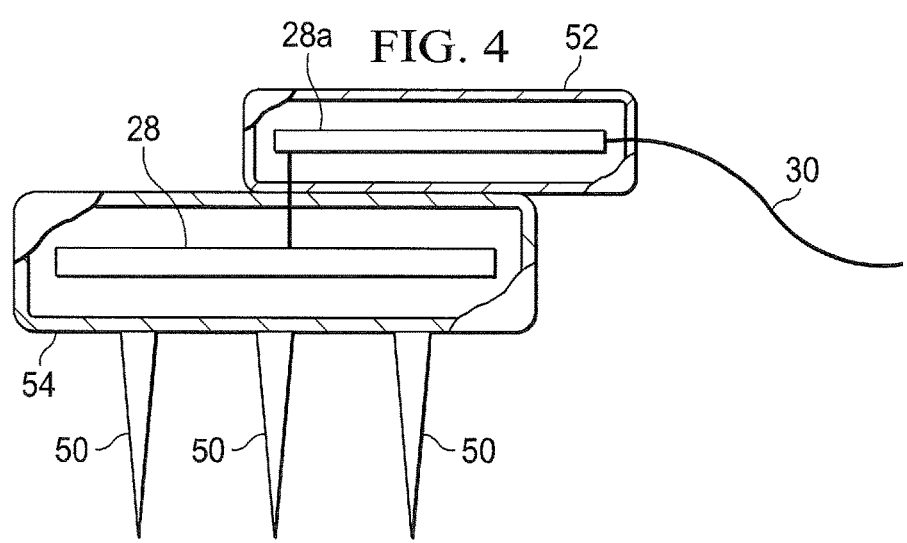

SENSOR FOR MEASURING THE ELECTROMAGNETIC FIELDS ON LAND AND UNDERWATER

BACKGROUND OF THE INVENTION

1. Field of the Invention

The present invention pertains to measuring low frequency electromagnetic fields at earthen surface, either on land or at the floor beneath a body of water.

2. Description of the Related Art

Electromagnetic (EM) soundings probe the electrical conductivity as a function of depth in the ground. Typical targets of interest are hydrocarbons, water, and ore bodies. Since the conductivities of such targets and the surrounding medium are generally quite dissimilar; they can, in theory, be discriminated by means of measurement of the subsurface conductivity. Using this methodology, the depth, thickness and lateral extent of materials of interest can be determined, depending on the availability of naturally produced low frequency EM waves or an EM source with the appropriate configuration and power.

A number of measurement scenarios are employed, including electric and/or magnetic sources, surface methods with many different source receiver geometries, borehole-to-surface methods, and cross borehole measurements. The principal passive sounding method is the magnetotelluric (MT) technique, in which the electric and magnetic amplitudes of long-period waves from natural planetary EM sources are monitored near the surface in order to determine the subsurface electrical impedance as a function of wave skin depth. Active methods include both spectral and time domain measurements of the fields in response to artificially generated waves. In the time domain, the decay of secondary magnetic fields generated from subsurface currents in response to an EM pulse under operator control can be recorded to estimate subsurface conductivity. Specific arrangements of sensors can be used to tailor the sensitivity to target subsurface features.

A common factor in electromagnetic soundings is the need to emplace and move sensors. For an electric field, the local electric potential is measured in two locations by electrically conducting electrodes buried near the ground surface. The difference between these measurements divided by the separation distance between the electrodes gives the electric field along the line of separation. For a magnetic field, a single sensor is placed upon the ground or buried at a shallow depth. Generally, it is desired to record the electric and magnetic fields in multiple orthogonal axes. For surveys on land, individual sensors are emplaced separately. As a result, so far as is known, the time taken to deploy the sensors and ensure they are oriented in the desired directions and with the desired orthogonally can be significant.

U.S. Pat. No. 5,770,945 related to a seafloor magnetotelluric system for measurement of electromagnetic fields underwater having two electric field sensor axes and two magnetic field sensor axes. Systems of this type weighed several hundred kilograms (kg) in air and were deployed and retrieved via a crane on a boat. Another sensing system (U.S. Published Patent Application No. 2008/0246485) measured three components of both the electric and magnetic field. However, this type of system still weighed in excess of 100 kg, making its use on land a significant operational challenge.

In some cases it has been desirable to collect electromagnetic data both on land and in adjacent locations underwater. Given the effort necessary to mobilize sensors to areas of use, many of which are remote, it would be desirable to have a dual mode sensor system that can work on land and underwater. In addition, it would only be necessary for a survey provider to purchase one dual mode set of sensor equipment rather than two individual sets that can work only in one environment.

In the prior art, the technologies to make electric field measurements on land and underwater were entirely different. Sea water provided a very favorable medium for coupling to electrical potentials, having high conductivity and a ready supply of reactive chloride ions that exchanged charge with standard metal salt electrodes.

On land, prior geophysical electrodes fell into two categories depending on the frequency of operation. Above 1 Hz solid metal electrodes (stainless steel, phosphor bronze) were generally hammered into the ground. Below 1 Hz, metal/metal salt combination electrodes (Ag/AgCl, $Cu/CuSO_4$, $Pb/PbCl_2$) were buried in excavated holes. The metal electrode was encased in a pot filled with wet mud (e.g., bentonite) that contained the required ions (Ag, Cu, Pb, and Cl). For improved performance, the pot was buried in a hole backfilled by the original ground material mixed with electrolyte. The pot coupled to the prepared ground, by means of the salt solution slowly leaking into the surrounding environment through a porous section of the pot. For convenience, both solid metal and metal/metal salt electrodes are for the purposes of the present invention termed salt electrodes. They operated based on electrochemical principles and relied on an exchange of ions with the ground in order to transfer electric charge, and thereby measure the local electric potential.

In contrast, magnetic field sensors used in geophysics on land and underwater could be the same for both purposes. However, electric field sensors generally provided the bulk of geophysical measurements, with arrays of up to 1000 sensors being used, while as few as two magnetic field sensors were needed. Accordingly, the significant difference in the configuration of the electrodes used on land and underwater has up until now precluded a single E-field sensor in particular, and a single electromagnetic sensor unit in general, from being used in both environments.

Capacitive electric field systems existed that coupled to local electric potentials via electromagnetic rather than electrochemical coupling. Capacitive sensors have the capability to operate both on land and underwater. However, the electrical contact impedance when coupling to water and dry ground are quite different. As a result, so far as is known, present capacitive E-field measurement systems are adapted to one type of environment (land or water) but did not operate adequately in both.

SUMMARY OF THE INVENTION

Briefly, the present invention provides a new and improved method of measuring with a sensor, which has electrodes for capacitive coupling to an ambient electric field, the electric fields produced within the earth by a geophysical source. According to the present invention, at least one sensor is located on the earth's surface. Electrical potentials in the local environment are capacitively coupled with the electrodes of the sensors. The ambient electrical potential is sensed with the sensor electrodes, and a measure of the sensed ambient electrical potential is formed.

BRIEF DESCRIPTION OF THE DRAWINGS

FIG. 3 is a schematic diagram of a sensor according to the present invention deployed on land.

FIG. 4 is a side view of a capacitive electrode of the sensor of FIG. 1.

DETAILED DESCRIPTION OF THE PREFERRED EMBODIMENTS

Figure 1:
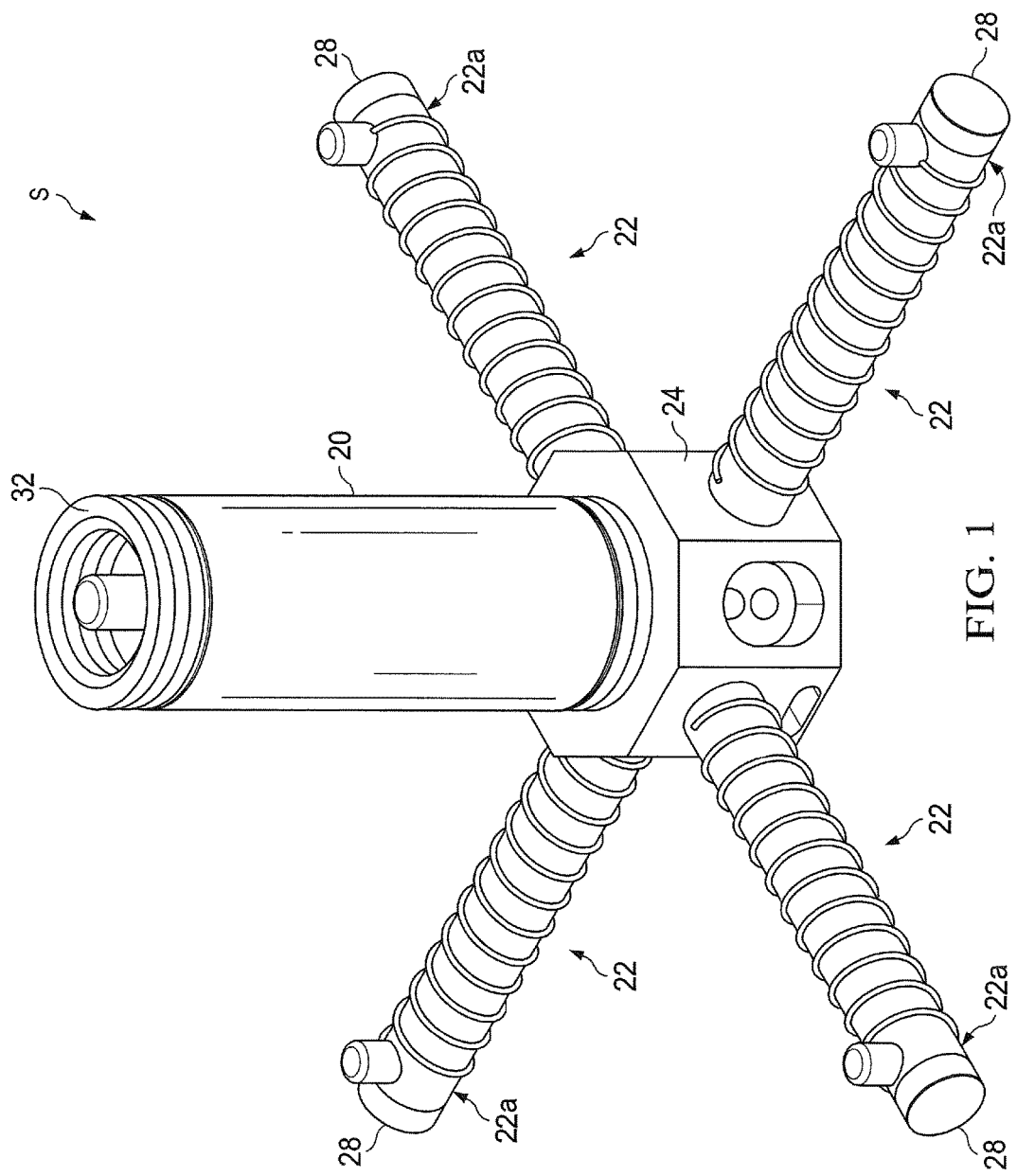
FIG. 1 is an isometric view of a sensor according to the present invention.

In the drawings, the letter S indicates a sensor according to the present invention that measures the electric field on land and underwater. As will be set forth, the sensor according to the present invention can be located or emplaced on a surface of the ground when on land or on a floor of a body of water, such as a seabed. The sensor S can be located on land without requiring burial or modification of the local environmental properties in any way. The sensor is capacitively coupling to an ambient electric field and at the same time forming a measure of the magnetic field induced by a geophysical source, such as a borehole to surface electromagnetic (or BSEM) survey.

Referring to FIG. 1, the sensor S includes a pressure vessel 20 that can withstand the target water depth for underwater surveys and measurements. The pressure vessel 20 has one or more arms 22 extending outwardly from an lower end or base 24. Preferably, the length of the arms 22 is in the range 0.2 m to 3 m. If desired, the arms 22 can be extendable to provide a range of lengths that can be adjusted in the field as required. The arms 22 can be solid, or also can be hollow pressure vessels themselves that house magnetic field sensors 26 (FIG. 5), batteries or other supporting electronics. Electric field sensing electrodes 28 (FIGS. 1 and 5) are mounted at an outer end 22a of the arms 22 for sensing the ambient electric field E by capacitive coupling. As will be set forth, first stage amplifiers 28a are provided in close proximity to each of the electrodes 28.

Electrical conductors 30 are mounted extending through fluid tight ports in the base 24 of the pressure vessel 20. The conductors 30 furnish the signals measured by the electrodes 28 and magnetic sensors 26 to a processing module P (FIG. 5) contained within the pressure vessel 20. A data connector port 32 (FIGS. 1 and 5) is mounted on a upper portion of the pressure vessel 20 to permit connection for telemetry or data transfer of data from the processing module P to an external processor or database for further processing and analysis.

In the processing module P (FIG. 5), measures of the electric field sensed by each of the electrodes 28 are received by voltage reduction amplifiers 34 to reduce the incoming voltages to prevent saturation and maximize the dynamic range of the final measurements, as will be set forth. Each of the voltages from the electrodes 28 after processing by the associated voltage reduction amplifier 34 is provide to a bank of differential amplifiers 36 along with a voltage from one of the other voltage reduction amplifiers 34.

The banks of differential amplifiers 36 thus form a measure of the differential of ambient electric field sensed between each pair of the group of sensing electrodes 28, and thus a voltage proportional to the electric field at the location the sensor S is deployed. The outputs from the differential amplifiers 36 are then provided to a selectable filtering stage composed of a corresponding number of selectable filters 38 and provided as analog inputs to a data acquisition unit 40. A suitable data acquisition unit, for example, is a Model MT24 from Schlumberger, Ltd. although it should be understood that others could be used.

Figure 5:
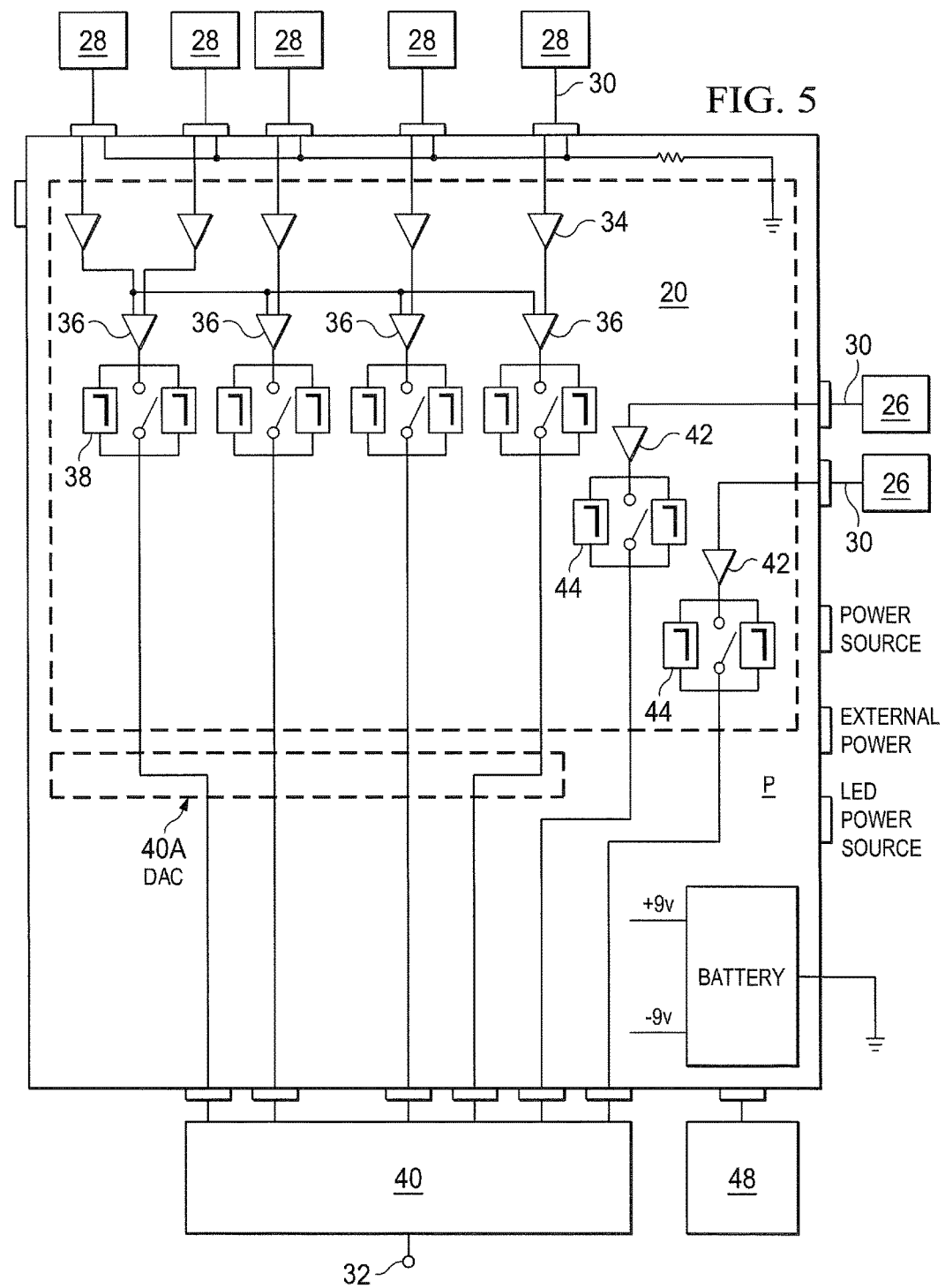
FIG. 5 is a schematic diagram of signal processing electronic circuitry of the sensor of FIG. 2.

The data acquisition unit 40 performs analog-to-digital conversion of the electric field gathered from the electrodes 28, and the converted digital data provided as analog outputs from the data acquisition unit 40 for storage and telemetry. The data acquisition unit 40 may be located in the pressure vessel 20 as shown in FIG. 5 or internally as an option as shown at 40A.

Measures of the magnetic field B (FIG. 6) sensed by each of magnetic sensors 26 (FIG. 5) are received in the data acquisition unit 40 by voltage reduction amplifiers 42 to also reduce the incoming voltages to prevent saturation and maximize the dynamic range of the final measurements. Each of the voltages from the magnetic sensors 26 is received in a selectable filtering stage composed of a corresponding number of selectable filters 44 and provided as analog outputs from the data acquisition unit 40 for storage and telemetry.

The data acquisition unit 40 also is provided with external global positioning satellite or GPS data from an external source in the sensor S as indicated at 48 in order to obtain sensor location data with a global satellite positioning time reference concurrently with the step of sensing the ambient electrical potential and the magnetic field by the sensor S.

The capacitive electric field sensor 28 of the present invention may take the form of an electrode component formed by a conductor that is exposed to the environmental potential in order to provide capacitive coupling. The conductor 28 is immersed in the water, and/or placed adjacent to the ground where the potential of interest is to be measured. The conductor electrode 28 is, as described, connected to the associated first stage amplifier 28a (FIG. 4) that acts primarily as an impedance conversion stage and is connected to the filters and amplifiers in the data acquisition unit 40 as described above.

In order to minimize pickup of external environmental potentials which would interfere with the measurement of the ground potential, the first stage amplifier 28a should be located in close proximity to the conductor 28. External potentials to be rejected include manmade electrical interference and impulse signals due to the passage of wind-blown charged dust particles past the sensor S in land surveys. The conductor 28 is electrically insulated in order to prevent an electrochemical reaction occurring between it and the environment. Other conductors present in the sensor should also be electrically insulated in order to prevent the occurrence of interface potentials and electrochemical noise which might arise from ionic exchange with the environment.

The sensitivity of an amplifier is determined by a tradeoff between the voltage and current noise present at its input. The voltage noise $V_n$ determines the minimum detectable signal at the amplifier input, while the current noise $I_n$ acts on the input impedance $Z_{in}$ present at the amplifier input to produce a further voltage noise which the product of the current noise $I_n$ and input impedance $Z_{in}$ that adds in quadrature to $V_n$. The effect of the current noise thus depends on input impedance and in many cases can be larger than the amplifier voltage noise.

For an electric field sensor, $Z_{in}$ is set by the contact impedance of the conductor to its environment. Because of its high electrical conductivity, the contact impedance of a sensor to sea water is always higher than on land. Accordingly, the contribution of current noise $I_n$ of a sensor in contact with seawater is lower than for the same amplifier and conductor in contact with land.

One approach to address the noise content difference is to optimize two separate first stage amplifiers, each connected to the same sensing conductor, one amplifier optimized for low current noise to be used when on land, and the other amplifier having higher current noise but optimized for lower voltage noise for use underwater.

Another approach is based on environmental noise due to water motion in shallow (<300 m depths) water being much higher than the minimum achievable amplifier voltage noise. In this second approach, rather than two amplifiers, the contact impedance and amplifier and current noise are jointly optimized for use on land at the conductor spacing to be used in the survey, and for water at the intended depth of deployment.

The first stage amplifier 28a is designed to provide the lowest internal noise referred to the sensor input. Accordingly, the gain of the first stage amplifier 28a is set to a low level, typically less than 10 db. Additional gain may be provided by a second stage amplifier and possibly further amplifier stages. The output voltage range of the voltage sensor 28 is set to be from about 10 to 50 times the smallest detectable voltage of the digitizing system to minimize the effect of environmental noise coupled into the cable connecting the sensor to the data acquisition unit. Within the processing module P, the voltage is reduced by a factor of from about 4 to about 20 to maximize the dynamic range of the final measurement.

Figure 2:
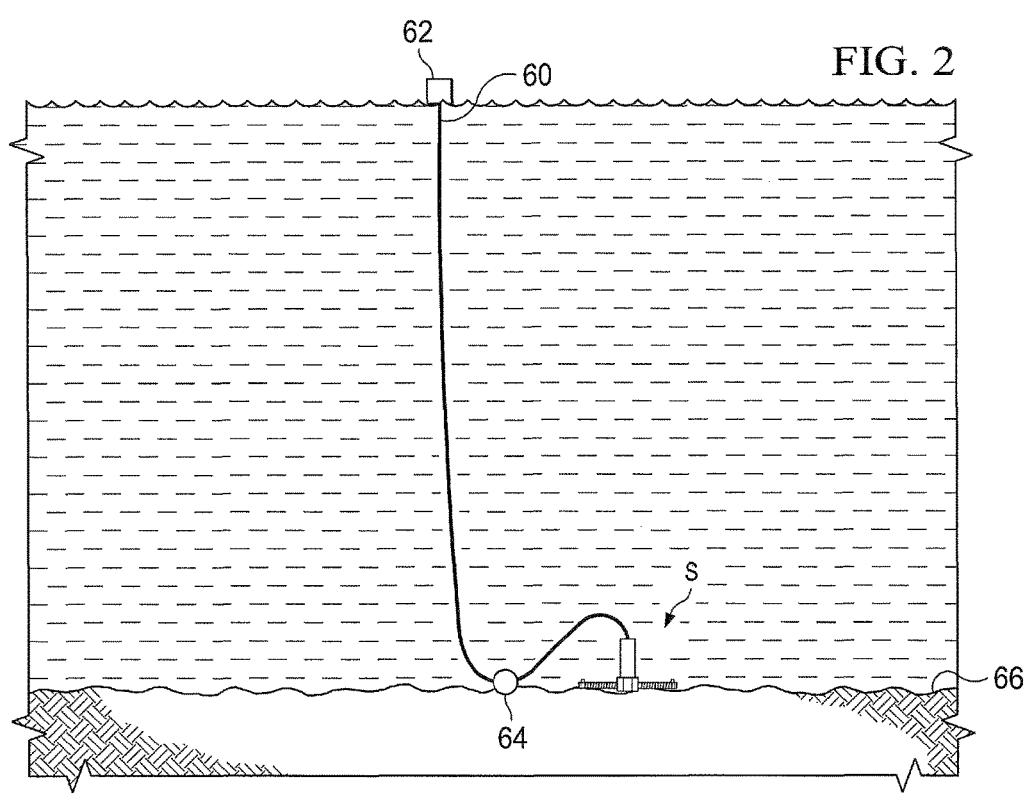
FIG. 2 is a schematic diagram of a sensor according to the present invention deployed in a body of water.

For operation in shallow water (FIG. 2), it is possible to deploy and retrieve the system using a rope 60 or similar flexible connection as shown in FIG. 2. The rope 60 is connected to a buoy 62 at the water surface and rests as indicated at 64 on the seabed 66 at some distance from the sensor S. This arrangement reduces the coupling of motion of the buoy 62 and rope 60 to the sensor below. The sensor S can be simply lowered to the seabed 66 via the rope 60 and later pulled back to the surface. This arrangement removes the need for attaching a heavy anchor to the sensor S for deployment and for incorporating floatation elements to return it to the surface. For use on land, the rope is not used or connected. The reduction in weight from not using an anchor and flotation element is of particular benefit for use on land.

If desired, the sensors may transmit the data obtained to the buoy where they can be observed or transmitted to another location. Accessing the data in this way allows ongoing quality assurance of the collected information that can be used to change the test conditions or repeat one or more parts of the survey For land application, the conductor 28 should be a mostly flat plate oriented parallel to the ground in order to maximize the capacitance coupling it to the ground potential. For convenience the conductor may have spike-like protrusions 50 as shown in FIG. 4 which penetrate the ground in order to mechanically anchor the conductor 28 to the ground. The protrusions 50 have the further benefit of increasing the coupling capacitance as well. The protrusions 50 should be short and narrow enough that they can be pressed into the ground manually. If desired, one or more sensors can be buried, for example to protect the sensor from damage or theft, or to measure potentials deeper within the ground. Underwater, the shape of the conductor does not matter because it can be simply immersed.

On land the impedance presented to the electrodes 28 is much higher than in water. This impedance can be the dominant source of electrical noise and reduce the sensitivity of the electric field measurement accordingly. To ameliorate this problem the electrodes 28 can be made detachable so that they can be removed from the arms and placed at a larger separation, as shown in FIG. 3. To enable a large separation, the first stage amplifier 28a should be integrated in close proximity to electrode 28 in a waterproof package 52, as shown schematically in FIG. 4.

As shown in FIG. 3, a cable 54 connects the output of the first stage amplifier 28a back to the data processing module P. The cable 54 can be removed and a shorter one inserted when an electrode is connected directly to an arm, or alternatively, the cable 54 can be coiled to reduce its length. When removed, the electrodes 28 can be aligned with the axes of the arms using a laser beam as a guide.

In the preferred mode of operation, sensor systems built according to the present invention are placed at desired positions based on survey requirements on the ground for land operations as shown in FIG. 1 or FIG. 3. For water operations, the sensor S is lowered to the seabed at the desired positions as shown in FIG. 2. A source of EM fields is located on land or in a borehole within the range of the sensor S and other like sensors required by the survey. Data are collected for a predetermined period and then the sensors are moved to new positions.

Figure 6:
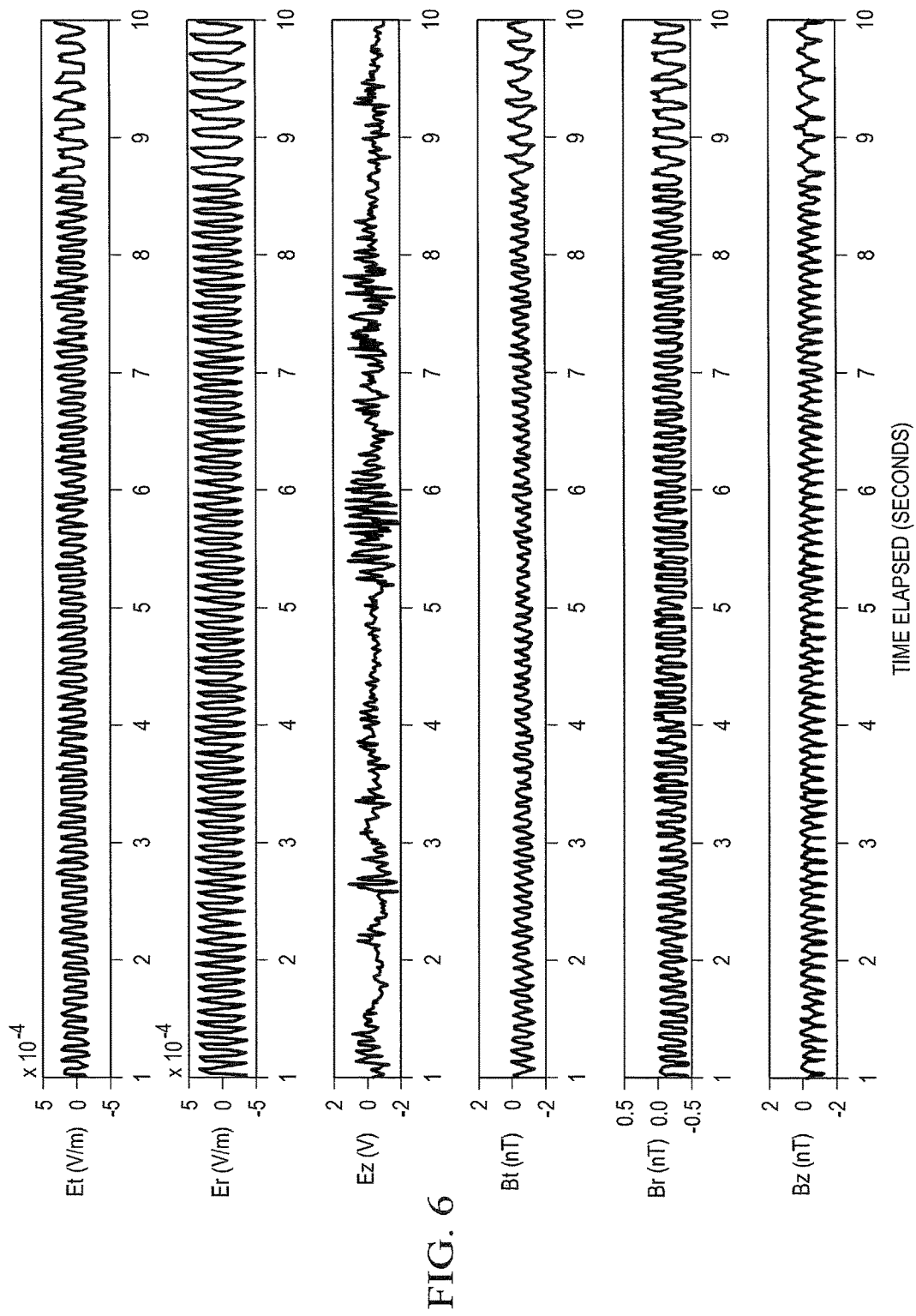
FIG. 6 is an example plot of waveforms of measures of sensed magnetic fields and electric potentials observable according to the present invention.

FIG. 6 is an plot of such measured electric field data E and magnetic field data B obtained with the present invention. The calculate the electric field it is necessary to multiply the voltage output the differential amplifiers 36 by a suitable calibration constant to account for the electronic gain of the amplifier chain. The resulting number is the true voltage difference, measured in units of volts between the two individual sensors used to measure the potential in the environment. The linear distance between the two sensors is determined either by the known dimensions of the instrument, or by direct measurement when deployed in the environment. This physical distance may be adjusted by a correction factor to account for distortion of the ambient electric field that may be caused by the instrument itself, for example by pressure vessel 20. Generally, the correction factor is close to 1 and may be 1. The electric field is given by dividing the true voltage difference by the corrected linear distance between the sensors. In FIG. 6 Er, is the horizontal electric field in the radial direction relative to a central point, and Et, the electric field in the tangential direction. Br and Bt are similarly the radial and tangential magnetic fields, while Bz is the vertical field.

On completing collection of the data underwater, the sensor(s) S can be moved by lifting them off the subsurface a small distance and moving the support vessel to drag the unit through the water to a new position. On land, preferably the sensors are slid along the ground. Typically the sensors are moved in 50 m to 200 m increments. In this way an array of sensors S can be rapidly reconfigured and an extensive map of the electromagnetic fields within the earth can be obtained in a short period of time.

From the foregoing, it can be seen that the present invention provides an electromagnetic sensor system that can operate with adequate electric field measurement sensitivity and accuracy on land and underwater. In particular, the present invention applies to a system and method that is capable of operating in both land and water environments. In addition, the present invention provides a system that is easier to deploy and recover than the prior art. For land use the system should be much lighter than present underwater measurements systems but should be fully integrated to allow the complete system to be moved as a unit. Applications of significant commercial and research interest exist in areas that require both on-land and underwater measurements, and when purchase price and mobilization cost favor the use of a single dual use sensor system over separate system for use on land an underwater. A particular application is to survey oil fields that are close to, or extend under, bodies of water.

The invention has been sufficiently described so that a person with average knowledge in the matter may reproduce and obtain the results mentioned in the invention herein described. Nonetheless, any skilled person in the field of technique, subject of the invention herein, may carry out modifications not described in herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention. Although described with reference to preferred embodiments of the invention, it should be readily understood that various changes and/or modifications can be made to the invention without departing from the spirit thereof. In general, the invention is only intended to be limited by the scope of the following claims.

What is claimed is:

1. A method of forming a measure of a three-dimensional electrical field and a measure of a three dimensional magnetic field induced in the earth during a borehole to surface electromagnetic survey with a borehole to surface electromagnetic field source, the method being performed by measuring with a plurality of sensors, the plurality of sensors each including a pressure vessel, the pressure vessel having at least three electric field sensing electrodes mounted therewith for sensing the three directional ambient electrical field of the earth, the pressure vessel further having magnetic field sensors therein for sensing the three directional earth magnetic field induced by the borehole to surface electromagnetic survey, and the pressure vessel further having a data memory therein, the method comprising the steps of:

locating on the earth's surface in a local environment at least one of the sensors and included pressure vessel having the at least three electric field sensing electrodes mounted therewith for sensing the three directional ambient electrical field of the earth and further having the magnetic field sensors therein for sensing the three directional earth magnetic field induced by the borehole to surface electromagnet survey;

locating the borehole to surface electromagnetic field source within range of the at least one of the sensors;

capacitively coupling with the electric field sensing electrodes of the sensors to electrical field of the three directional ambient electrical field of the earth in the local environment of the located at least one of the sensors and included pressure vessel;

sensing in the located at least one of the sensors and included pressure vessel the three directional ambient electrical field of the earth in the local environment with the at least three electric field sensing electrodes of the sensors, the step of sensing being performed by measuring voltages sensed by each of the at least three electric field sensing electrodes;

forming a measure of the sensed ambient electrical field of the earth by forming a measure of voltage differences between the measured voltages between pairs of the at least three electric field sensing electrodes;

producing a three-dimensional magnetic field within the earth by electromagnetic pulses from the borehole to surface electromagnetic source during the borehole to surface electromagnetic survey;

forming with the magnetic field sensors in the pressure vessel a voltage measure representing the three-dimensional magnetic field produced in response to electromagnetic pulses produced by the borehole to surface electromagnetic source;

converting the voltage measure representing the three-dimensional magnetic field produced by the borehole to surface electromagnetic source into digital format; and storing in the data memory the formed measures of the sensed three directional ambient electrical field of the earth from the pairs of the at least three electric field sensing electrodes and the formed measure digital format voltage measure representing the three directional magnetic field produced in response to electromagnetic pulses produced by the borehole to surface electromagnetic source.

2. The method of claim 1, wherein the step of locating at least one of the sensors comprises:

placing the at least one sensor on a land ground surface without modification of the ground surface.

3. The method of claim 2, wherein the sensor electrodes are mounted in sensor arms which are mechanically detachable from a main body of the sensor, and further including the steps of:

detaching the sensor arms from the sensor body; and placing the sensor arms at spaced positions from the sensor body during the step of placing the sensor on a land ground surface.

4. The method of claim 3, further including the step of maintaining data communication between the sensor body and the electric field sensing electrodes after the step of detaching the sensor arms from the sensor body.

5. The method of claim 1, further including the step of:

obtaining sensor location data with a global satellite positioning time reference concurrently with the step of sensing the ambient electrical field of the earth.

6. The method of claim 1, wherein the step of locating at least one of the sensors comprises:

lowering the at least one sensor to a surface in a body of water.

7. The method of claim 6, further including the step of:

transferring the formed measure of the sensed three directional ambient electrical field of the earth to data storage on the surface of the body of water.

8. The method of claim 6, further including the step of:

attaching a tether for deployment and retrieval of the sensor from the body of water.

9. The method of claim 1, wherein the step of locating the at least one of the sensors comprises:

placing a plurality of the sensors on a land ground surface of the earth.

10. The method of claim 1, wherein the step of locating the at least one of the sensors comprises:

lowering a plurality of sensors to the earth's surface in a body of water.

11. The method of claim 1, further including the step of:

converting the measure of voltage differences between measured voltages from pairs of the at least three electric field sensing electrodes into digital format.

12. The method of claim 1, wherein the three directional ambient electrical field of the earth comprises at least a radial direction and a tangential direction to a central reference point.

13. The method of claim 1, wherein the three directional magnetic field of the earth comprises a vertical direction, a radial direction and a tangential direction to a central reference point.

14. A method of forming a measure of a three-dimensional electrical field and a measure of a three dimensional magnetic field induced in the earth during a borehole to surface electromagnetic survey with a borehole to surface electromagnetic field source, the method being performed by measuring with a plurality of sensors, the plurality of sensors each including a pressure vessel, the pressure vessel having therein at least three electric field sensing electrodes mounted therewith for sensing the three directional ambient electrical field of the earth, the electric field sensing electrodes being mounted in sensor arms which are mechanically detachable from a main body of the sensor, the pressure vessels further having magnetic field sensors therein for sensing the three directional earth magnetic field induced by the borehole to surface electromagnetic survey, and the pressure vessel further having a data memory therein, the method comprising the steps of:

locating on the earth's surface in a local environment at least one of the sensors and included pressure vessel having the at least three electric field sensing electrodes mounted therewith for sensing the three directional ambient electrical field of the earth and further having the magnetic field sensors therein for sensing the three directional earth magnetic field on a land ground surface;

locating the borehole to surface electromagnetic field source within range of the at least one of the sensors;

detaching the sensor arms from the sensor body;

placing the sensor arms at spaced positions from the sensor body during the step of placing the sensor on a land ground surface;

capacitively coupling with the electric field sensing electrodes of the sensors to electrical potential of the three directional ambient electrical field of the earth in the local environment of the located at least one of the sensors and included pressure vessel;

sensing in the located at least one of the sensors and included pressure vessel the three directional ambient electrical field of the earth in the local environment with the at least three electric field sensing electrodes of the sensors in the detached sensor arms, by measuring voltages sensed by each of the at least three electric field sensing electrodes;

forming a measure of the sensed ambient electrical field of the earth by forming a measure of voltage differences between the measured voltages between pairs of the at least three electric field sensing electrodes;

producing a three-dimensional magnetic field within the earth by the borehole to surface electromagnetic source during a borehole to surface electromagnetic survey;

forming with the magnetic field sensors in the pressure vessel a measure of the three-dimensional magnetic field produced in response to electromagnetic pulses produced by the borehole to surface electromagnetic source;

converting the voltage measure representing the three-dimensional magnetic field magnetic field produced by the borehole to surface electromagnetic source into digital format; and storing in the data memory the formed measures of the sensed three directional ambient electrical field of the earth and the formed measure of the three directional magnetic field produced in response to electromagnetic pulses produced by the borehole to surface electromagnetic source.

15. The method of claim 14, further including the step of maintaining data communication between the sensor body and the electric field sensing electrodes after the step of detaching the sensor arms from the sensor body.

* * * * *

UNITED STATES PATENT AND TRADEMARK OFFICE
CERTIFICATE OF CORRECTION

PATENT NO. : 10,132,952 B2
APPLICATION NO. : 13/914128
DATED : November 20, 2018
INVENTOR(S) : Alberto F. Marsala and Andrew Dennis Hibbs It is certified that error appears in the above-identified patent and that said Letters Patent is hereby corrected as shown below:

In the Claims

In Claim 1, Column 7, Line 49 the claim language reads:
"to surface electromagnet survey;"
It should read:
"to surface electromagnetic survey;"

Signed and Sealed this
Fifth Day of February, 2019

Andrei Iancu
*Director of the United States Patent and Trademark Office*